United States Patent Office 3,006,832
Patented Oct. 31, 1961

3,006,832
METHOD OF MAKING NUCLEAR FUEL ELEMENTS
Jay W. Moore, Middle River, Md., and Glenn M. Ellis, Roan Mountain, Tenn., assignors to The Martin Company, Middle River, Md., a corporation of Maryland
No Drawing. Filed May 9, 1958, Ser. No. 734,111
3 Claims. (Cl. 204—154.2)

This invention relates to a novel article of manufacture and to a method of preparing the same.

In the manufacture of tubular fuel elements, a powdered mixture of fissionable material in ceramic form, e.g., $UO_2$, and a metal are compacted into sheets and then fabricated into a hollow cylindrical form. In a co-pending application of Tibor F. Nagey, Jack Hunter and William A. Maxwell, entitled "Transportable Nuclear Reactor Power Plant," Serial No. 684,501, filed September 17, 1957, now abandoned, a reactor is disclosed in which tubular fuel elements of the present invention may be employed. The tubular fuel elements are fastened to supports or headers which form part of the heat exchange apparatus. The ends of the fuel elements so fastened are provided with tubular metal sections called "dead-ends" by means of which the fuel elements are welded or otherwise attached to the headers. "Dead-ends" also serve to seal the ends of the fuel element so that the fissionable material is completely encased and thereby isolated from the environment.

Previously "dead-ends" were attached to the fuel element core by a seam welding technique, requiring separate manufacture of metal end sections and the core. The core was manufactured by subjecting a compacted cermet strip to successive rolling and annealing steps until full density was obtained. It was necessary to trim away a considerable amount of the strip edge which had cracked during rolling. The trimmed cermet strip was then welded to "dead-ends," and the resulting strip shaped into a tube. Aside from calling for individual fabrication of the cermet strip and "dead-ends," the previous method involved significant waste of fissionable material which had to be reprocessed.

The present invention makes it possible to fabricate a complete core section having "dead-ends" in one step and also eliminates cracking of the cermet strip during rolling.

Therefore, an object of this invention is to provide a novel method which is especially suited for the manufacture of fuel elements in nuclear reactors.

Another object of this invention is to provide a method of preparing a material which is suitable for use in the manufacture of fuel elements.

Other objects and advantages of this invention will become apparent from the following description and explanation thereof.

The present invention is concerned with an article comprised of a cermet containing fissionable material in ceramic form and a metal, the edges of the cermet being joined to metal end sections.

In the manufacture of the novel article of this invention, a powder mixture of a matrix metal and a fissionable ceramic material is placed in a flat die cavity and a powdered metal is placed contiguous with this mixture. The entire powdered material is compacted at a suitable pressure into a flat sheet, and by so doing, two, three or four edges of the powder mixture section are bonded or joined to contiguous metal sections. The resultant green compact may be sintered and rolled to full density. The densified strip may then be used in the fabrication of flat plate fuel elements or tubular fuel elements as hereinafter described.

The powdered fissionable material and powdered matrix metal used to make the cermet have an average particle size of about 200–500 mesh. The matrix metal can be any metal which will bond metallurgically to the metal sections and which can withstand elevated temperatures without undergoing serious mechanical failure. Because of the importance of neutron economy as a factor in reactor efficiency, it is preferred that the non-fissionable materials used in fuel elements have a thermal neutron absorption cross section below about 5.0 barns. Moreover, the material should have a relatively high melting point, for example, about 650° to 2620° C. Suitable metals having the above properties are found in groups IIIa, VIb and VIII of the periodic table. Specific examples of matrix metals are aluminum, stainless steel, molybdenum, nickel, etc. The matrix metal is admixed with a fissionable material in ceramic form so that the mixture contains about 50 to about 85% by volume of the metal. Specific examples of the fissionable materials are uraninum dioxide, urasonic oxide, plutonium oxide, thorium oxide, etc.

The metal used in the metal or edge sections is desirably the same in composition and particle size as the matrix metal. Dissimilar metals can be used and those skilled in the art will readily appreciate the kinds of metals which are compatible for metallurgical bonding. The "edge metal" can be, for example, aluminum, stainless steel, nickel, molybdenum, etc.

In preparing the green compact, powdered metal is placed along and contiguous to two or more edges of the powdered mixture in the flat die cavity. Ordinarily, the edges from which "dead ends" are formed have a length of about ⅛ to ½ inch, and a width equal to that of the cermet strip.

The die to be used for forming the green compact has a flat cavity of suitable length and width. The powder in the die is subjected to a pressure of about 10,000 to about 50,000 p.s.i.g., although it should be understood that the pressure can be varied above or below the range, just so long as the resultant green compact possesses sufficient mechanical strength for handling. Compacting is usually effected at ambient temperature level, although here again heat may be applied, if it is so desired.

The green compact is densified by a sintering treatment wherein the matrix metal will migrate and form an interlacing network which holds the fissionable material. The "edge metal" will metallurgically bond to the matrix metal at the interfaces between the cerment section and the edge sections and thus the entire article can be further handled without fear of fracturing or separating the border or boundary of metal from the cermet. The temperature at which sintering is conducted is well known to those skilled in the art and for that reason requires no elaborate explanation except to say that those skilled in the art would understand the temperature to be used for sintering of the individual metals. For example, a temperature of about 500° to about 600° C. is employed for sintering aluminum, whereas a temperature of about 1150° to about 1300° C. is used in the case of stainless steel. The heat treatment is conducted in the absence of oxygen, e.g., a vacuum, a reducing atmosphere of hydrogen, normally gaseous hydrocarbon, etc., or an inert atmosphere such as nitrogen, etc.

After the article has been sintered it can be fabricated or subjected to treatment for changing of size or shape. In the case of fuel elements for nuclear reactors, the density of the material is an important factor as regards emission of nuclear energy, heat transfer characteristics, etc. The sintered strip may be densified further by successive rolling and annealing passes. As a result, the final product can have a density of about 95 to about 98% of theoretical. If desired, after the material has been sintered it can be formed into a tube or other shape. To provide a better understanding of the present invention, reference will be had to the following specific example.

A die having a flat cavity 1¼ inches wide, 13 inches long and ¼ inch deep was used in the following run: a powder mixture containing 60% by weight of powdered aluminum and the remainder uranium dioxide and having an average particle size of about 300 mesh was added to the die cavity so as to form a central layer ⅞ inch wide, 12 inches long and 0.06 inch thick. Aluminum powder having an average particle size of 235 mesh was then placed in the die cavity along the sides of the central layer, occupying a space 3/16 inch wide and .06 inch high. Additional aluminum was placed at both ends of the central layer to make up "dead ends." The "dead ends" were each 1¼ inches wide, ½ inch long and 0.06 inch high. The powder in the die was then subjected to a pressure of 40,000 p.s.i.g. As a result, a green compact was formed which had ½ inch long "dead ends" and a 3/16 inch wide aluminum strip on opposite sides of a center portion of cermet of ⅞ inch width. The entire strip was 13 inches along. The green compact was hot rolled at a temperature of 575° F. to a reduction in cross-sectional area of 50% and the result was compared with a cermet prepared in essentially the same way but without the aluminum border or boundary on oppositely disposed sides of the cermet. It was found that the aluminum bordered cermet could be hot rolled easily without cracking or fracturing the sides as happened in the case of the sheet containing cermet only.

The densified sheet obtained after rolling, etc. which contains four aluminum edges can be used as such in the fabrication of a flat type fuel element, or the aluminum strips along the length of the sheet can be trimmed off and the trimmed sheet fabric into the tubular element.

Having thus provided a description of the present invention, it should be understood that the invention is defined by the appended claims.

We claim:

1. An improved method for rolling cermet sheet which comprises the steps of pressing a powder mass comprising a layer of particles of a matrix metal admixed with particles of a refractory oxide and a layer of metal particles in contact with the periphery of the first said layer of particles, sintering the green compact so obtained so as to form a cermet layer metallurgically bonded to a peripheral metal strip, and rolling the resulting composite sintered sheet to desired thickness, said metal strip acting to prevent cracking of the periphery of the cermet layer along the lines of juncture therebetween.

2. The method of claim 1 wherein said refractory oxide is an oxide selected from the group consisting of uranium dioxide, uranosic oxide, thorium oxide and plutonium oxide.

3. The method of claim 1 wherein said metals are selected from the group consisting of stainless steel, aluminum, nickel and molybdenum.

References Cited in the file of this patent

UNITED STATES PATENTS

| 2,313,227 | De Bats | Mar. 9, 1943 |
| 2,676,393 | Lieberman | Apr. 27, 1954 |
| 2,805,473 | Handwerk et al. | Sept. 10, 1957 |
| 2,818,605 | Miller | Jan. 7, 1958 |
| 2,907,705 | Blainey | Oct. 6, 1959 |

FOREIGN PATENTS

| 752,152 | Great Britain | July 4, 1956 |

OTHER REFERENCES

International Conference on the Peaceful Uses of Atomic Energy, 1955, vol. 9, pp. 196–207.